Patented June 5, 1945

2,377,759

UNITED STATES PATENT OFFICE 2,377,759

PRODUCTION FROM ACETYLENE OF AROMATIC HYDROCARBONS AND OF SATURATED AND UNSATURATED HYDROCARBONS

Christian Jean Coupard, Paris, France, assignor to the firm of Synben Aktiengesellschaft, Vaduz, Liechtenstein No Drawing. Application December 19, 1941, Serial No. 423,692. In France November 19, 1940

7 Claims. (Cl. 260—673)

The present invention relates to a process for the conversion of acetylene into aromatic liquid hydrocarbons, adapted to serve directly as liquid fuel for motive purposes, and saturated or unsaturated hydrocarbons.

The conversion of acetylene into condensable products was long ago effected by Berthelot by means of a purely thermal polymerisation which forms a large quantity of a tar mixture and requires prolonged heating.

The use has already been patented of certain catalysts which accelerate the reaction and increase the proportion of liquid hydrocarbon, whether aromatic or saturated or unsaturated, but the formation of tar and coke which obstructed the apparatus, could not be avoided.

It has now been discovered that these secondary products are almost entirely eliminated and an almost colourless liquid hydrocarbon for motive purposes is obtained, by using as catalyst carbide of aluminium or a mixture comprising carbide of aluminium, that is to say a mixture of carbide of aluminium and nitride of aluminium for example, or a mixture adapted to form aluminium carbide under the conditions of reaction, and working at temperatures around 700° C. and at normal pressure. The proportion of nitride of aluminium can vary considerably beyond the limits currently observed in the working with technical carbide of aluminium, without harmfully affecting the speed of the reaction and the nature of the liquid obtained.

The carbide of aluminium or the mixture having a basis of carbide of aluminium or containing carbide of aluminium can moreover be used by mixing the catalyst with grains of coke or retort carbon or graphite, serving for heating by the aid of an electric current, in particular when a mixture containing 30 to 70% of grains of conductive carbon and/of carbon surrounded by carbide of aluminium is used for heating the mass. The mixture remains electrically conductive and can be heated by the Joule effect. The electric current can advantageously be supplied by the aid of electrodes of iron coated with a deposit of aluminium applied for example by projection with a pistol (Schoop process).

The heating of the whole system could also be effected for example by means of an electric resistance consisting of metallic wired and containing carbide of aluminium alone or allied with nitride of aluminium.

Finally the heating could be effected in any other desired manner; the furnace for heating can be of any desired type, being for instance a vertical furnace, a horizontal furnace, a rotary furnace, etc.

The acetylene, used alone or mixed with hydrogen or with hydrocarbons richer than itself in hydrogen, such as result in particular from the re-use of residual gases, passes over the catalyst at a temperature which should not depart from the mean temperature of 700° C. by more than 125° C. The time of contact is from 50 to 100 seconds for the above stated mean temperature.

The condensed products, colourless or but slightly coloured, contain a higher proportion of aromatic compounds than obtained with any other catalyst. They constitute a liquid fuel for motive purposes of high octane number. The proportion converted after several hours of formation of the catalyst can reach or even exceed 80% by weight.

The uncondensed gases and hydrogen can be re-used in admixture with fresh acetylene or employed for heating the contact mass.

By varying the temperature of reaction and the time of contact, the constitution of the resulting motive fuel can be substantially modified in a desired direction. In any case the process under consideration permits a considerable quantity of a very light and aromatic liquid fuel to be obtained by distillation, along with a balance of naphthalene and polymerised hydrocarbons. Further with the present catalyst, the residual tars are negligible in quantity.

The products thus obtained can naturally be collected at low temperature. A part of the products can also be condensed at ordinary temperature and the remaining products then absorbed by solid or liquid absorbants.

Whatever the method of recovery employed, the cooling can be effected by a series of refrigerations which the gaseous mixture undergoes successively, or by a series of rectifying columns so as to effect at the same time both the condensation and the rectification of the mixture.

*Example*

Acetylene is caused to traverse a tube of retort carbon filled with grains of aluminium carbide and grains of retort carbon in equal quantities. Heating of the said tube and its contents is effected for example by the passage of an electric current furnished to the said mixture. The temperature in the interior of the tube is maintained at about 700° C. and the pressure at the normal or atmospheric value. The product obtained is collected by a series of refrigerations, of which the last effects a depression of temperature down to −60° C. The collected product of condensation, subjected to fractional distillation in a column, gives the following results:

At 75° C. in the operation the first drop of liquid forms.

From 75° to 85° C., 57% of the liquid fuel consisting for the greater part of benzene distils off. From 85° to 180° C., 5% of supplementary liquid distils off. From 180° to 230° C., 21% of liquid, consisting for the greater part of naphthalene, distils off. From 230° to 280° C., 10% of liquid consisting for the greater part of diphenyl distils off. Above 280° C. 7% of residue distils off.

The residues are negligible.

What I claim is:

1. A process for the production from acetylene of liquid hydrocarbons, suitable for direct use as motor fuel, which comprises passing a gas containing acetylene at a temperature around 700° C. and at normal pressure over a catalyst containing aluminium carbide as catalytically active ingredient, whereby substantially only liquid products result, and subjecting the products of the reaction to fractional distillation.

2. A process for the production from acetylene of liquid hydrocarbons, suitable for direct use as motor fuel, which comprises passing a gaseous mixture rich in acetylene together with hydrogen and hydrocarbons richer in hydrogen than is acetylene, at a temperature around 700° C. and at a pressure around normal over a catalyst containing aluminium carbide as catalytically active ingredient, contact being maintained for about 50 to 100 seconds, whereby substantially only liquid products result, and subjecting the products of the reaction to fractional distillation.

3. A process for the production from acetylene of liquid hydrocarbons, suitable for direct use as motor fuel, which comprises passing a gas containing acetylene at a temperature around 700° C. and at normal pressure over a catalyst comprising a mixture with a basis of aluminium carbide as catalytically active ingredient, whereby substantially only liquid products result, and subjecting the products of the reaction to fractional distillation.

4. A process for the production from acetylene of liquid hydrocarbons, suitable for direct use as motor fuel, which comprises passing a gas containing acetylene at a temperature around 700° C. and at normal pressure over a catalyst comprising a mixture of aluminium carbide and aluminium nitride as catalytically active ingredients, whereby substantially only liquid products result and subjecting the products of the reaction to fractional distillation.

5. A process as set forth in claim 1 wherein the catalyst includes an admixture of extraneous coke with the aluminium carbide.

6. A process as set forth in claim 1 wherein the catalyst includes an admixture of extraneous retort carbon with the aluminium carbide.

7. A process for the production from acetylene of aromatic hydrocarbons and of at least one member of the group consisting of saturated and unsaturated hydrocarbons, suitable for direct use as liquid fuel for motive purposes, which comprises passing a sufficient electric current through a conductive mixture containing aluminium carbide as catalytically active ingredient to raise its temperature to about 700° C., passing over said mixture a gas rich in acetylene at around normal pressure for a period of 50 to 100 seconds, whereby substantially only liquid products result, and fractionating the product of the reaction.

CHRISTIAN JEAN COUPARD.